(12) United States Patent
Komura et al.

(10) Patent No.: US 10,589,646 B2
(45) Date of Patent: Mar. 17, 2020

(54) VEHICLE SEAT CONFIGURED TO RESTRAIN LOWER LIMBS

(71) Applicant: TOYOTA JIDOSHA KABUSHIKI KAISHA, Toyota-shi, Aichi-ken (JP)

(72) Inventors: Takamichi Komura, Okazaki (JP); Osamu Fukawatase, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/134,775

(22) Filed: Sep. 18, 2018

(65) Prior Publication Data

US 2019/0106029 A1    Apr. 11, 2019

(30) Foreign Application Priority Data

Oct. 5, 2017 (JP) .................. 2017-195111

(51) Int. Cl.
| | |
|---|---|
| *B60N 2/427* | (2006.01) |
| *B60N 2/42* | (2006.01) |
| *B60N 2/02* | (2006.01) |
| *B60N 2/90* | (2018.01) |

(52) U.S. Cl.
CPC ....... *B60N 2/42763* (2013.01); *B60N 2/0276* (2013.01); *B60N 2/4221* (2013.01); *B60N 2/914* (2018.02)

(58) Field of Classification Search
CPC ........ B60N 2/914; B60N 2/0276; B60N 2/62; B60N 2/42763; B60N 2/4221; B60N 2/427; B60R 21/26; B60R 21/207

USPC .................................. 297/284.11, 216.1
See application file for complete search history.

(56) References Cited

U.S. PATENT DOCUMENTS

| | | | |
|---|---|---|---|
| 6,450,573 B1* | 9/2002 | Yamaguchi | B60N 2/4221 297/216.1 |
| 7,452,030 B2* | 11/2008 | Yoshikawa | B60N 2/4221 280/730.1 |
| 7,726,739 B2* | 6/2010 | Wain | B60N 2/986 297/284.9 |
| 9,428,137 B2* | 8/2016 | Lee | B60N 2/42 |
| 2003/0052519 A1* | 3/2003 | Reynolds | B60N 2/42763 297/216.1 |

(Continued)

FOREIGN PATENT DOCUMENTS

| | | |
|---|---|---|
| JP | H07-081466 A | 3/1995 |
| JP | 2004-034797 A | 2/2004 |

(Continued)

*Primary Examiner* — Milton Nelson, Jr.
(74) *Attorney, Agent, or Firm* — Oliff PLC (57) ABSTRACT

A vehicle seat includes: a power tilt mechanism; a seat front panel that forms a part of a front portion of a seat cushion, bridges a right and left pair of side frames of the seat cushion, and is configured to be rotatable by the power tilt mechanism about a tilt central axis that is provided in linking portions, at which the seat front panel is linked to the side frames, an axial direction of the tilt central axis coinciding with a seat width direction; and a control device that is connected to the power tilt mechanism, the control device being configured to activate the power tilt mechanism to cause the seat front panel to rotate in a seat upward direction, in a case in which a vehicle impact in which an occupant sitting on the seat cushion will move in a seat forward direction has been predicted.

7 Claims, 5 Drawing Sheets

(56) References Cited

U.S. PATENT DOCUMENTS

| | | | |
|---|---|---|---|
| 2004/0055806 A1 | 3/2004 | Masuda et al. | |
| 2012/0007407 A1 | 1/2012 | Komamura et al. | |
| 2014/0015234 A1* | 1/2014 | Nukaya | B60N 2/42718 |
| | | | 280/730.1 |

FOREIGN PATENT DOCUMENTS

| | | |
|---|---|---|
| JP | 2010-047223 A | 3/2010 |
| JP | 2010-052535 A | 3/2010 |
| JP | 2010-234884 A | 10/2010 |
| JP | 2012-016970 A | 1/2012 |

* cited by examiner

VEHICLE SEAT CONFIGURED TO RESTRAIN LOWER LIMBS

CROSS-REFERENCE TO RELATED APPLICATION

This application is based on and claims priority under 35 USC 119 from Japanese Patent Application No. 2017-195111 filed on Oct. 5, 2017, the disclosure of which is incorporated by reference herein.

BACKGROUND

Technical Field

The present disclosure relates to a vehicle seat.

Related Art

Japanese Patent Application Laid-open (JP-A) No. 2010-052535 and JP-A No. 2012-016970 disclose vehicle seats including a built-in seat cushion airbag (hereinafter called "airbag") device. The airbag device is housed inside a seat cushion, has an inflator and an airbag, and supplies, to the inside of the airbag, gas from an inflator activated at the time of a vehicle impact to thereby push up in the seat upward direction the lower limbs of an occupant sitting in the vehicle seat. This reduces the phenomenon in which the body of the occupant slides forward under the seat belt (i.e., submarining).

More recently, self-driving technologies that automatically carry out some or all of the driving of a vehicle are being realized, and as opportunities for the occupant to drive are reduced by these self-driving technologies, it is conceivable that the instrument panel will be reduced in size for the purpose of making the cabin interior space more comfortable. At the same time, in order to restrain the lower limbs of the occupant at the time of a frontal impact to the vehicle, a configuration provided with a knee airbag that inflates and deploys, using the instrument panel as a reaction force surface, to restrain the lower limbs of the occupant is conceivable. However, if the instrument panel is reduced in size as described above, there is the possibility that a sufficient reaction force will not be obtainable from the instrument panel at the time of the inflation and deployment of the knee airbag, resulting in an inability to sufficiently restrain the lower limbs of the occupant. Furthermore, in order to restrain the lower limbs of the occupant without being dependent on the cabin interior space, it is desired to restrain the lower limbs of the occupant with the vehicle seat closest to the lower limbs. Consequently, the above-described related art has room for improvement in this respect.

SUMMARY

In consideration of the above-described circumstances, the present disclosure provides a vehicle seat that may effectively restrain the lower limbs of an occupant at the time of an impact to the vehicle.

An aspect of the disclosure is a vehicle seat including: a power tilt mechanism; a seat front panel that forms a part of a front portion of a seat cushion, bridges a right and left pair of side frames of the seat cushion, and is configured to be rotatable by the power tilt mechanism about a tilt central axis that is provided in linking portions, at which the seat front panel is linked to the side frames, an axial direction of the tilt central axis coinciding with a seat width direction; and a control device that is connected to the power tilt mechanism, the control device being configured to activate the power tilt mechanism to cause the seat front panel to rotate in a seat upward direction, in a case in which a vehicle impact in which an occupant sitting on the seat cushion will move in a seat forward direction has been predicted.

According to the aspect, the vehicle seat includes the seat front panel (hereinafter called "the front panel") and the control device. The front panel configures a part of the front portion of the seat cushion and bridges the right and left pair of side frames of the seat cushion. Additionally, the front panel is configured to be rotatable by the power tilt mechanism about the tilt central axis that are provided in the linking portions, at which the front panel is linked to the side frames, and whose axial directions coincide with the seat width direction. Consequently, the seat angle of the front portion of the seat cushion with respect to the vehicle floor may be adjusted following the rotation of the front panel.

The control device is connected to the power tilt mechanism, and when the control device foresees a type of vehicle impact in which the occupant sitting on the seat cushion will move in the seat forward direction (hereinafter called a "forward movement impact"), the control device activates the power tilt mechanism to thereby cause the front panel to rotate in the seat upward direction. Consequently, the front portion of the seat cushion becomes tilted, with respect to the rear portion of the seat cushion, in the seat upward direction heading in the seat forward direction and pushes up the thighs of the occupant in the seat upward direction. As a result, movement of the occupant in the seat forward direction at the time of a forward movement impact may be restrained.

In the above aspect, the seat front panel may be provided with a seat cushion airbag device including: an inflator that supplies gas; and a seat cushion airbag that inflates and deploys upon receiving the supply of gas from the inflator, and thereby causes the seat cushion to bulge in the seat upward direction, and the control device may be configured to cause the seat cushion airbag to inflate and deploy, in a case in which the vehicle impact has been detected after the prediction of the vehicle impact.

According to this configuration, the front panel is provided with the airbag device including the inflator that supplies gas and the airbag that inflates and deploys upon receiving the supply of gas from the inflator. When the airbag receives the supply of gas from the inflator, the airbag causes the seat cushion to bulge in the seat upward direction. The control device causes the airbag to inflate and deploy when the vehicle impact has been detected after the prediction of the vehicle, that is, after the front end portion of the front panel has been rotated in the seat upward direction by the power tilt mechanism. Consequently, when the airbag is inflated and deployed, a reaction force is obtained from the front panel tilted in the seat upward direction heading in the seat forward direction and, therefore, it is easier to obtain a reaction force acting in the seat rearward direction. As a result, the ability to restrain the lower limbs of the occupant moving in the seat forward direction at the time of a forward movement impact may be improved.

In the above aspect, the inflator may be disposed at a front portion of the seat front panel, and the seat cushion airbag may be stored in a spread-out state on the seat front panel, and in the inflated and deployed state, a rear end of the seat cushion airbag is positioned at a seat front side of the tilt central axis of the seat front panel.

According to this configuration, the inflator is attached to the front portion of the front panel, the airbag is stored in a spread-out state on the front panel, and in the inflated and deployed state of the airbag, the rear end of the airbag is positioned on the seat front side of the tilt central axis of the front panel. Consequently, the entire inflated and deployed airbag is positioned on the front panel and, therefore, when the airbag inflates and deploys, a reaction force may be reliably obtained from the front panel tilted by the power tilt mechanism. As a result, the ability to restrain the lower limbs of the occupant may be further improved.

In the above aspect, the seat cushion airbag device may further include: a reaction force panel that is configured to support a front end of the seat cushion airbag from a seat front side when the seat cushion airbag is inflated and deployed; and a stopper that is configured to restrain displacement of the reaction force panel in the seat forward direction when the seat cushion airbag is inflated and deployed.

According to this configuration, the airbag device includes the reaction force panel that supports from the seat front side the front end of the airbag at the time of the inflation and deployment of the airbag. Furthermore, the airbag device includes the stopper that restrains displacement of the reaction force panel in the seat forward direction at the time of the inflation and deployment of the airbag. Consequently, displacement of the airbag in the seat forward direction is restrained by the reaction force panel at the time of the inflation and deployment of the airbag, and an even greater reaction force acting in the seat rearward direction may be obtained.

In the above aspect, the inflator may be housed inside a housing portion that is provided in the seat front panel and is recessed in a seat downward direction, the reaction force panel may be joined to the front end of the seat cushion airbag, and a portion of the reaction force panel may be positioned between the inflator and a front wall of the housing portion when the seat cushion airbag is inflated and deployed.

According to this configuration, the inflator is housed inside the housing portion that is provided in the front panel and is recessed in the seat downward direction, the reaction force panel is joined to the front end of the airbag, and a portion of the reaction force panel is positioned between the inflator and the front wall of the housing portion at the time of the inflation and deployment of the airbag. Consequently, displacement of the reaction force panel in the seat forward direction caused by the reaction force panel receiving the inflation and deployment force of the airbag is restrained as a result of the portion of the reaction force panel being sandwiched between the inflator and the front wall. That is, when the airbag is inflated and deployed, a reaction force acting in the seat rearward direction may be obtained with a simple configuration.

In the above aspect, an upper end portion of the reaction force panel may be positioned inside the housing portion when the seat cushion airbag is stored.

According to this configuration, the upper end portion of the reaction force panel is positioned inside the housing portion when the airbag is stored. That is, the reaction force panel does not project from the housing portion. Consequently, the sitting comfort of the occupant in normal times may be improved.

As described above, the vehicle seat pertaining to the disclosure may effectively restrain the lower limbs of an occupant at the time of an impact to the vehicle.

DETAILED DESCRIPTION

A vehicle seat 10 pertaining to an exemplary embodiment of the disclosure will be described below in reference to FIG. 1 to FIG. 5. Arrow FR, arrow UP, and arrow OUT illustrated in the drawings indicate a forward direction (traveling direction) of the vehicle, an upward direction, and an outward direction in the vehicle width direction, respectively. When description is given below simply using the directions of front/rear, right/left, and upper/lower, unless otherwise specified these will be understood to mean front/rear in the vehicle front and rear direction, right/left in the vehicle right-left direction (vehicle width direction), and upper/lower in the vehicle vertical direction.

(Configuration of Vehicle Seat)

Figure 1:
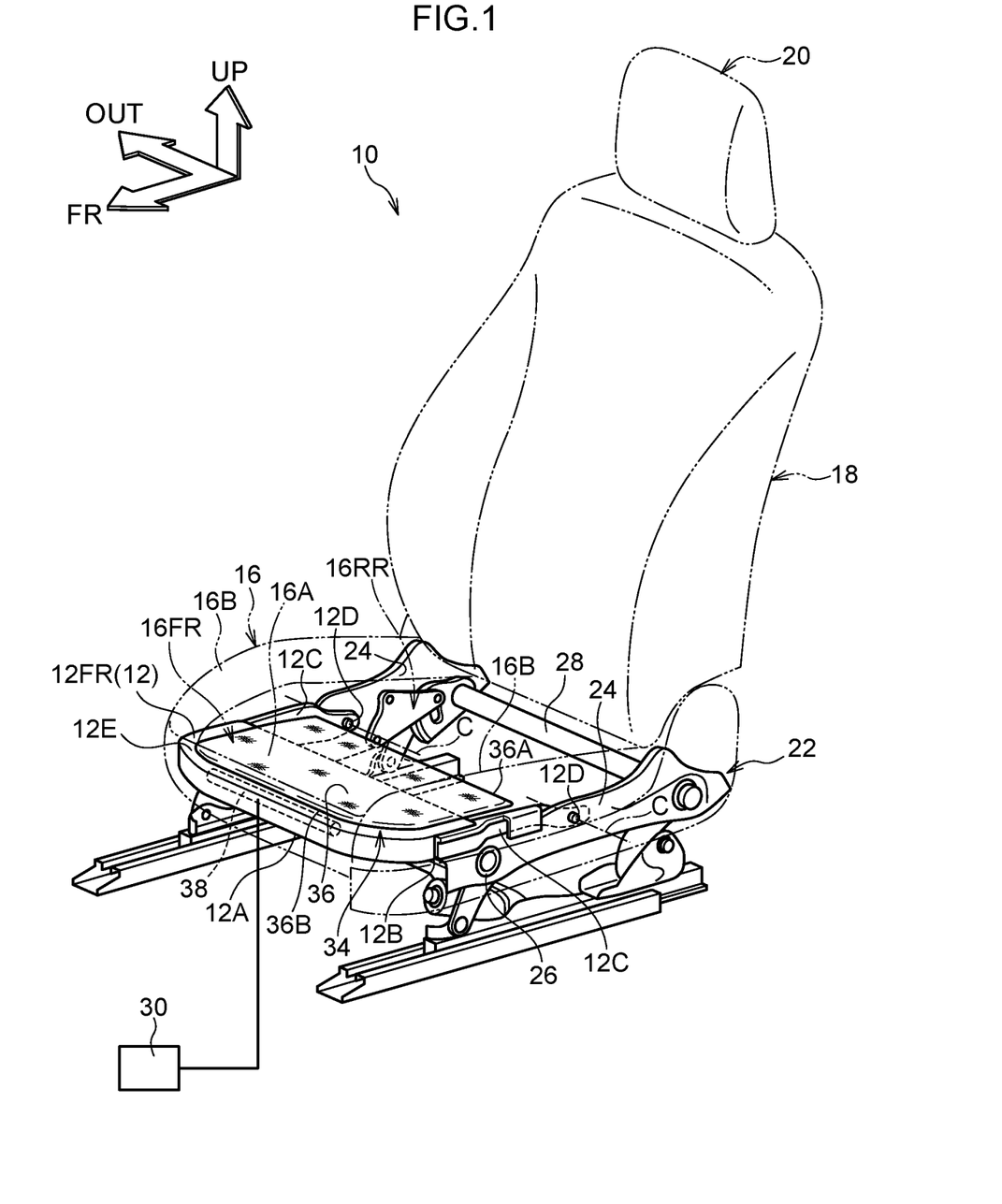
FIG. 1 is a schematic perspective view illustrating a state prior to the rotation of a front panel and prior to the activation of an airbag device in a vehicle seat pertaining to an embodiment.
Figure 3:
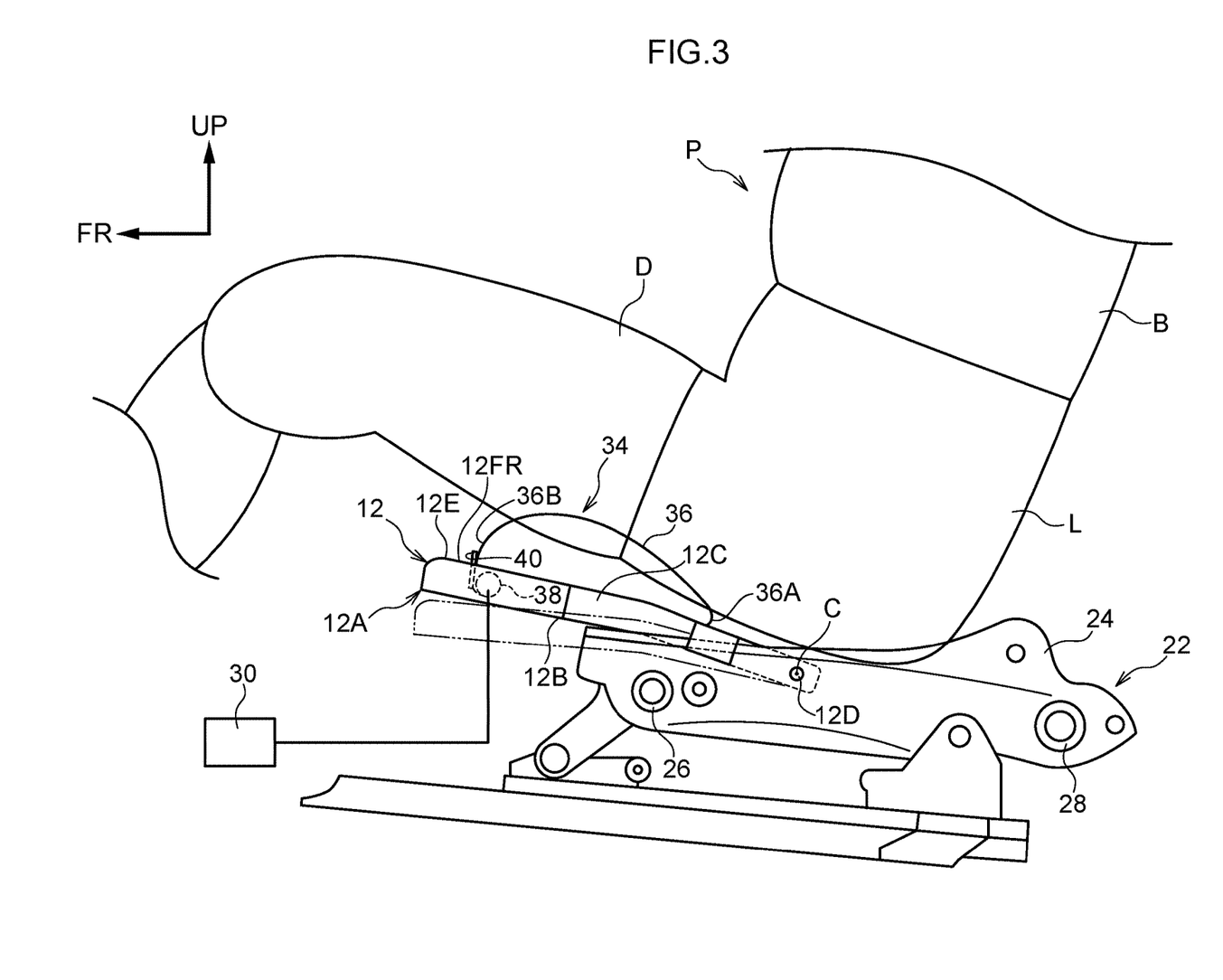
FIG. 3 is a schematic side view illustrating a state in which the front panel has been rotated and the airbag device has been activated in the vehicle seat pertaining to the embodiment.

As illustrated in FIG. 1, the vehicle seat 10 pertaining to the exemplary embodiment is configured by a seat cushion 16 for supporting a lower back L (including the buttocks) and thighs D of an occupant P illustrated in FIG. 3, a seat back 18 for supporting a back B (see FIG. 3) of the occupant P, and a head rest 20 for supporting the head (not illustrated in the drawings) of the occupant P. The front, rear, right, left, upper, and lower directions of the vehicle seat 10 coincide with the front, rear, right, left, upper, and lower directions of the vehicle.

The seat cushion 16 has a seat portion 16A (main body) on which the occupant P sits and side support portions 16B disposed on both right and left sides of the seat portion 16A. The right and left side support portions 16B are disposed for reducing lateral shifting of the lower back L and the thighs D (see FIG. 3) with respect to the seat portion 16A and project upward from the seat portion 16A. Right and left side frames 24, included in a seat cushion frame 22 that is a frame for the seat cushion 16, are disposed in the right and left side support portions 16B.

The front end portions of the right and left pair of side frames 24 are linked to each other in the seat width direction by a front frame 26, and the rear end portions of the right and left pair of side frames 24 are linked to each other in the seat width direction by a rear frame 28. Plural seat cushion springs (not illustrated in the drawings) configured by S-springs bridge the front frame 26 and the rear frame 28. In the exemplary embodiment, the right and left side frames 24 are configured by metal plates, and the front frame 26 and the rear frame 28 are configured by pipe members.

A front panel 12 is attached to the right and left pair of side frames 24. The front panel 12 is formed of a stamped steel plate member, is cut in a substantially tabular shape that is long in the seat width direction, and is disposed facing the seat upward direction. An edge portion 12A on the front side of the front panel 12 and edge portions 12B on both right and left sides of the front panel 12 are bent in the seat downward direction to enhance the structural strength of the front panel 12 with respect to bending and twisting. Both right and left side portions of the front panel 12 are linked to the front and rear direction substantially middle portions of the side frames 24 by linking portions 12D (pins) via a right and left pair of tilt panels 12C. The side frames 24 are rotatable in a predetermined angular range about tilt central axis C of the linking portions 12D. As a result of the above-described configuration, the front panel 12 configures part of a front portion 16FR of the seat cushion 16. The tilt central axis C is disposed so as to be lined up in positions on the same axis as each other.

The right and left pair of tilt panels 12C are each formed of a stamped steel plate member, are each cut in a long tabular shape whose longitudinal direction coincides with the front and rear direction, and are disposed so as to face the inner surface sides of the side frames 24. The upper edge portions of the tilt panels 12C are bent in the seat outward direction to enhance the structural strength of the tilt panels 12C with respect to bending and twisting. The tilt panels 12C are integrally joined by rivets (not illustrated in the drawings) to the edge portions on both right and left sides of the front panel 12.

Figure 2:
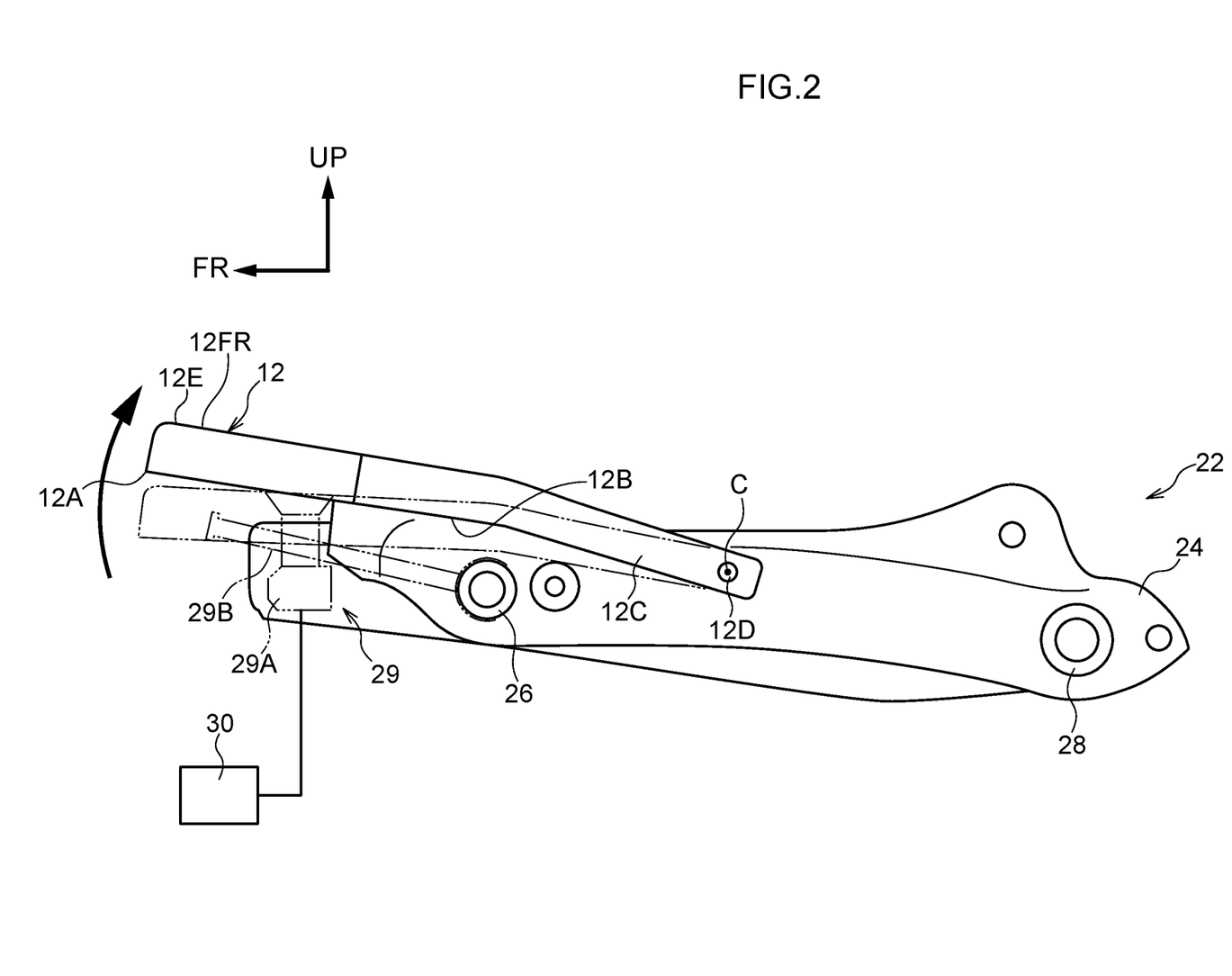
FIG. 2 is a schematic side view illustrating a rotating state of the front panel in the vehicle seat pertaining to the embodiment.

As illustrated in FIG. 2, the seat cushion 16 is provided with a power tilt mechanism 29. The power tilt mechanism 29 uses a drive motor 29A electrically connected to a control device 30 to cause the front panel 12 to rotate about the tilt central axis C. Specifically, a rod 29B bridges the front panel 12 and the front frame 26, and the rear end portion of the rod 29B is rotatably attached to the front frame 26. The front end portion of the rod 29B is attached in such a way as to be relatively movable with respect to the front panel 12. The drive motor 29A is attached to the reverse surface of the front panel 12. When the drive motor 29A is driven, the drive motor 29A moves along the longitudinal direction of the rod 29B, whereby the front panel 12 is rotatable in the predetermined angular range about the tilt central axis C.

The control device 30 is configured by an ECU (not illustrated in the drawings), for example. An impact detection unit (not illustrated in the drawings), which detects a forward movement impact, and a pre-crash sensor (not illustrated in the drawings) that foresees (predicts) the forward movement impact, are electrically connected to the control device 30. Furthermore, an operation switch (not illustrated in the drawings) is electrically connected to the control device 30. The operation switch is disposed in a position where it is able to be operated by the occupant P (see FIG. 3) sitting in the vehicle seat 10 in the cabin. By operating the operation switch, the occupant P may rotate the front panel 12 and adjust the front portion 16FR of the seat cushion 16 along the seat height direction. By this configuration, the seat angle of the seat cushion 16 may be made different between the front portion 16FR and a rear portion 16RR of the seat cushion 16.

A seat cushion pad (not illustrated in the drawings) comprising foam, such as a urethane pad, is provided on the upper side of the front panel 12 and the side frames 24. The surface of the seat cushion pad is covered by a seat cover (not illustrated in the drawings).

(Airbag Device)

Figure 4:
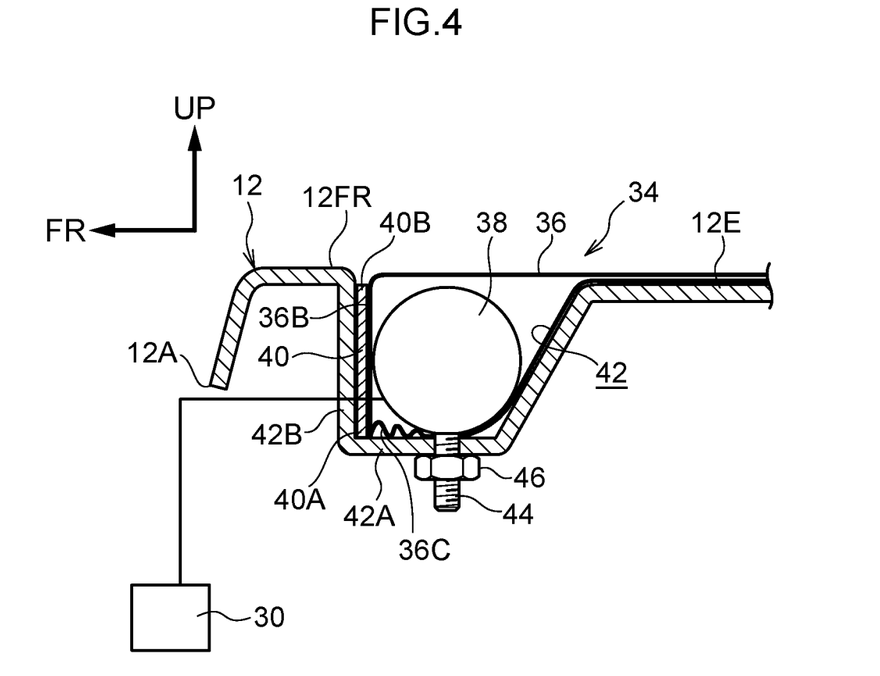
FIG. 4 is an enlarged side sectional view of relevant parts schematically illustrating a state prior to the activation of the airbag device in the vehicle seat pertaining to the embodiment.

As illustrated in FIG. 4, an airbag device 34 is attached to the front panel 12. The airbag device 34 includes an airbag 36, an inflator 38, and a reaction force panel 40.

The airbag 36 is a bag made by, for example, sowing a nylon or polyester cloth material (base cloth). The airbag 36 is stored in a flatly spread-out state. In the stored state, part of the airbag 36 is disposed between an upper surface 12E of the front panel 12 and a lower surface (not illustrated in the drawings) of the seat cushion pad and is supported from the lower side by the front panel 12. A rear end 36A of the airbag 36 is disposed on the seat front side of the tilt central axis C (see FIG. 1).

The inflator 38 is a cylinder type inflator and is housed, with its axial direction coinciding with the seat width direction, inside a housing portion 42 formed in the seat width direction central portion of the front panel 12. The housing portion 42 is provided in the front portion 12FR of the front panel 12 and is recessed in the seat downward direction with respect to the upper surface 12E of the front panel 12. The inflator 38 is housed inside the housing portion 42 in a state in which in the inflator 38 is housed inside a front end 36B side of the airbag 36. Bolts 44 are secured to the inflator 38 in plural places. The bolts 44 are inserted through the airbag 36 and a bottom portion 42A of the housing portion 42 and have nuts 46 screwed onto them, whereby the inflator 38 is fastened together with the front portion 36B of the airbag 36 to the bottom portion 42A.

The control device 30 is electrically connected to the inflator 38. The control device 30 activates the inflator 38 when the control device 30 detects that the vehicle has experienced a forward movement impact on the basis of a signal from the impact detection unit. When the inflator 38 is activated, gas is discharged from gas discharge portions (not illustrated in the drawings) provided in the axial direction end portions of the inflator 38. As a result, gas is supplied to the inside of the airbag 36, and the airbag 36 inflates and deploys (see FIG. 5).

The reaction force panel 40 is attached from the seat front side to the front end 36B of the airbag 36. The reaction force panel 40 is made of resin as an example, is formed in a tabular shape whose thickness direction coincides with the front and rear direction, and is disposed between the inflator 38 serving as one part of a stopper and a front wall 42B of the housing portion 42 serving as another part of the stopper. The reaction force panel 40 is set to a size such that, in the stored state of the airbag 36, a lower end portion 40A of the reaction force panel 40 is in abutting contact with the bottom portion 42A and an upper end portion 40B of the reaction force panel 40 is positioned in a location corresponding to the upper end portion of the front wall 42B. That is, the reaction force panel 40 does not project from the housing portion 42 in the stored state of the airbag 36. The airbag 36 is provided with an extra length portion 36C ranging, in the stored state of the airbag 36, from a position corresponding to the lower end portion 40A of the reaction force panel 40 to a position where the inflator 38 is secured by the bolts 44. The length of the extra length portion 36C in the seat front and rear direction is, as described later, set to a length such that the lower end portion 40A of the reaction force panel 40 is positioned between the front wall 42B and the inflator 38 when the airbag 36 inflates and deploys.

Figure 5:
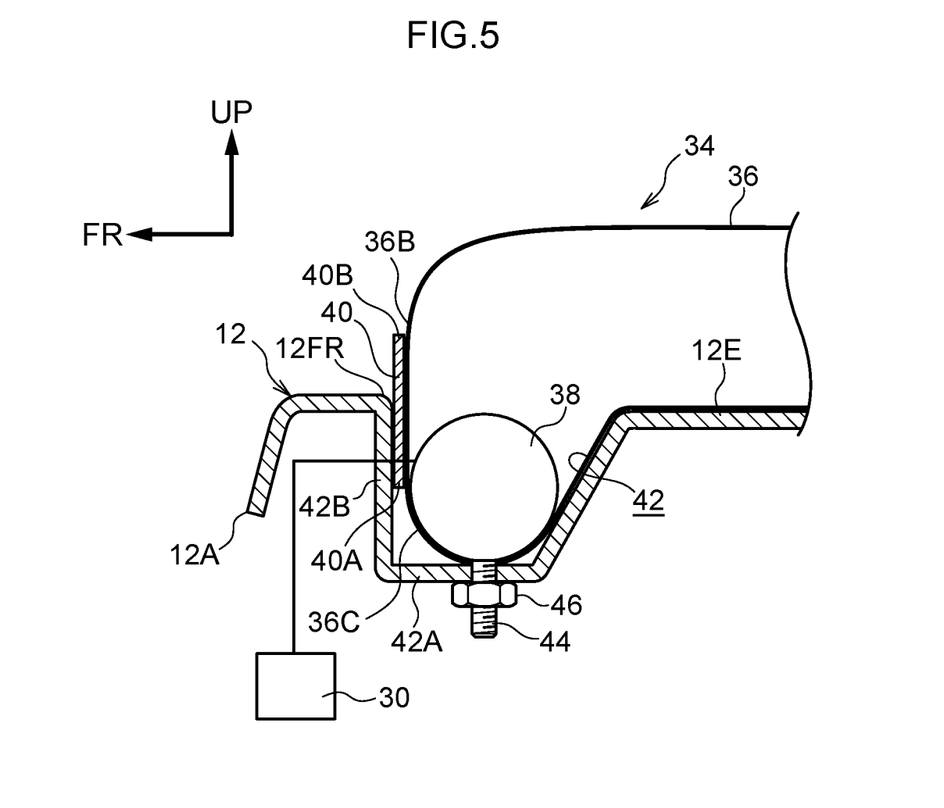
FIG. 5 is an enlarged side sectional view of relevant parts schematically illustrating a state at the time of the activation of the airbag device in the vehicle seat pertaining to the embodiment.

Furthermore, as illustrated in FIG. 5, in the inflated and deployed state of the airbag 36, the reaction force panel 40 moves upward in accompaniment with the inflation and deployment of the airbag 36. At this time, the lower end portion 40A is configured to position between the front wall 42B and the inflator 38. The seat width direction dimension of the reaction force panel 40 is set substantially identical to the seat width direction dimension of the front wall 42B.

(Operation and Effects)

Next, the operation and effects of the exemplary embodiment will be described.

In the present embodiment, as illustrated in FIG. 1, the vehicle seat 10 includes the front panel 12 and the control device 30. The front panel 12 configures part of the front portion 16FR of the seat cushion 16 and bridges the right and left pair of side frames 24 of the seat cushion 16. The front panel 12 is configured to be rotatable by the power tilt mechanism 29 (see FIG. 2) about the tilt central axis C that are provided in the linking portions 12D, at which the front panel 12 is linked to the side frames 24, and whose axial directions coincide with the seat width direction. Consequently, the seat angle of the front portion 16FR of the seat cushion 16 with respect to the vehicle floor (not illustrated in the drawings) is able to be adjusted following the rotation of the front panel 12.

The control device 30 is connected to the power tilt mechanism 29, and when the control device 30 foresees a forward movement impact, the control device 30 activates the power tilt mechanism 29 to thereby cause the front panel 12 to rotate in the seat upward direction. Consequently, the front portion 16FR of the seat cushion 16 is tilted, with respect to the rear portion 16RR of the seat cushion 16, in the seat upward direction heading in the seat forward direction and pushes up the thighs D (see FIG. 3) of the occupant P in the seat upward direction. As a result, movement of the occupant P in the seat forward direction at the time of a forward movement impact may be restrained.

Furthermore, the front panel 12 is provided with the airbag device 34 including the inflator 38 that supplies gas and the airbag 36 that inflates and deploys upon receiving the supply of gas from the inflator 38. When the airbag 36 receives the supply of gas from the inflator 38, the airbag 36 causes the seat cushion 16 to bulge in the seat upward direction. Furthermore, the control device 30 causes the airbag 36 to inflate and deploy when the control device 30 detects the vehicle impact after the control device 30 has foreseen the vehicle impact, that is, after the front portion 12FR of the front panel 12 has been rotated in the seat upward direction by the power tilt mechanism 29. Consequently, at the time of the inflation and deployment of the airbag 36, a reaction force is obtained from the front panel 12 tilted in the seat upward direction heading in the seat forward direction and, therefore it is easier to obtain a reaction force acting in the seat rearward direction. As a result, the ability to restrain the lower limbs of the occupant moving in the seat forward direction at the time of a forward movement impact may be improved.

Moreover, the inflator 38 is attached to the front portion 12FR of the front panel 12, the airbag 36 is stored in a spread-out state on the front panel 12, and in the inflated and deployed state of the airbag 36, the rear end 36A of the airbag 36 is positioned on the seat front side of the tilt central axis C of the front panel 12. Consequently, since the entire inflated and deployed airbag 36 is positioned on the front panel 12, when the airbag 36 inflates and deploys, a reaction force may be reliably obtained from the front panel 12 tilted by the power tilt mechanism 29. As a result, the ability to restrain the lower limbs of the occupant may be further improved.

Moreover, the airbag device 34 has the reaction force panel 40 that supports from the seat front side the front end 36B of the airbag 36 at the time of the inflation and deployment of the airbag 36. The airbag device 34 is configured such that the lower end portion 40A of the reaction force panel 40 is sandwiched between the inflator 38 and the front wall 42B as a stopper that restrains displacement of the reaction force panel 40 in the seat forward direction at the time of the inflation and deployment of the airbag 36. Consequently, displacement of the airbag 36 in the seat forward direction is restrained by the reaction force panel 40 at the time of the inflation and deployment of the airbag 36, and an even greater reaction force acting in the seat rearward direction may be obtained.

Furthermore, the inflator 38 is housed inside the housing portion 42 that is provided in the front panel 12 and is recessed in the seat downward direction, the reaction force panel 40 is joined to the front end 36B of the airbag 36, and the lower end portion 40A of the reaction force panel 40 is positioned between the inflator 38 and the front wall 42B of the housing portion 42 at the time of the inflation and deployment of the airbag 36. Consequently, displacement of the reaction force panel 40 in the seat forward direction caused by the reaction force panel 40 receiving the inflation and deployment force of the airbag 36 is restrained as a result of the lower end portion 40A of the reaction force panel 40 being sandwiched between the inflator 38 and the front wall 42B. That is, at the time of the inflation and deployment of the airbag 36, a reaction force acting in the seat rearward direction may be obtained with a simple configuration.

Moreover, the upper end portion 40B of the reaction force panel 40 is positioned inside the housing portion 42 when the airbag 36 is stored. That is, the reaction force panel 40 does not project from the housing portion 42. Consequently, the sitting comfort of the occupant P (see FIG. 3) in normal times may be improved.

It will be noted that although in the above-described embodiment the front, rear, right, left, upper, and lower directions of the vehicle seat 10 coincide with the front, rear, right, left, upper, and lower directions of the vehicle, the vehicle seat 10 is not limited to this and may also be configured such that, by turning the vehicle seat 10 on the vehicle floor (not illustrated in the drawings), the front side of the vehicle seat 10 faces the vehicle rear direction or the vehicle side direction. In this case, the control device 30 detects the direction the vehicle seat 10 faces, and when the control device 30 foresees a forward movement impact in the direction the vehicle seat 10 faces, the control device 30 activates the power tilt mechanism 29 to thereby cause the front panel 12 to rotate in the seat upward direction. As a result, movement of the occupant P (see FIG. 3) in the seat forward direction may be restrained regardless of the direction the vehicle seat 10 faces. Furthermore, the control device 30 may also cause the airbag device 34 to inflate and deploy when the control device 30 detects the forward movement impact after the control device 30 has foreseen the forward movement impact.

Moreover, displacement of the reaction force panel 40 in the seat forward direction caused by the reaction force panel 40 receiving the inflation and deployment force of the airbag 36 at the time of the inflation and deployment of the airbag 36 is restrained as a result of the inflator 38 and the front wall 42B being made to function as a stopper, but the vehicle seat 10 is not limited to this configuration. A projection or the like may be formed as a stopper on the front panel 12 so that displacement of the reaction force panel 40 in the seat forward direction is restrained by this projection or the like.

Or, displacement of the reaction force panel 40 in the seat forward direction may be restrained by any other configuration.

The reaction force panel 40 is configured such that the upper end portion 40B is positioned inside the housing portion 42 when the airbag 36 is stored. However, the reaction force panel 40 is not limited to this and may be configured such that it projects from the housing portion 42. Furthermore, a recess portion that houses the upper end portion 40B may also be formed in the cushion pad in correspondence to this projecting upper end portion 40B.

Furthermore, in the above-described embodiment, the airbag device 34 is provided in the vehicle seat 10 including the rotatable front panel 12, but the airbag device 34 is not limited to this and may also be provided in a non-rotating front panel 12.

Moreover, the reaction force panel 40 is configured such that the lower end portion 40A is positioned between the inflator 38 and the front wall 42B at the time of the inflation and deployment of the airbag 36. However, the reaction force panel 40 is not limited to this and may also be configured in such a way that a part of the reaction force panel 40 other than the lower end portion 40A is positioned between the inflator 38 and the front wall 42B.

The reaction force panel 40 is joined from the seat front side to the front end 36B of the airbag 36, but the reaction force panel 40 is not limited to this and may also be provided inside the airbag 36 by joining it to the base cloth of the airbag 36 beforehand and then forming the bag.

Furthermore, in order to make the movement of the reaction force panel 40 smoother, a guide member or a rail member, for example, may be provided between the reaction force panel 40 and the front wall 42B.

The inflator 38 is positioned in the front portion of the front panel 12, but the inflator 38 is not limited to this and may also be disposed in the seat front and rear direction central portion of the front panel 12 or in another location.

The airbag 36 is stored in a spread-out state on the front panel 12, but the airbag 36 is not limited to this and may also be stored in a folded-up state inside the housing portion 42 or may be stored in another way. Furthermore, the rear end 36A of the airbag 36 is positioned on the seat front side of the tilt central axis C in the inflated and deployed state of the airbag 36, but the airbag 36 is not limited to this. The rear end 36A of the airbag 36 may also be positioned on the seat rear side of the tilt central axis C or may be in another position in a vehicle seat 10 that does not have the tilt central axis C.

The airbag 36 is inflated and deployed when the control device 30 detects a frontal impact to the vehicle after the control device 30 has foreseen the frontal impact to the vehicle, but the airbag 36 is not limited to this and may also inflate and deploy when the control device 30 foresees a frontal impact to the vehicle or may also inflate and deploy at a timing other than this.

The disclosure is not limited to the above-described example configurations and may also be modified and implemented in a various of ways, in addition to the above-described example configurations, in a range that does not depart from the spirit of the disclosure.

What is claimed is:

1. A vehicle seat comprising:
   a power tilt mechanism;
   a seat front panel forming a part of a front portion of a seat cushion, the seat front panel bridging a right side frame and a left side frame of the seat cushion and being configured to be rotatable by the power tilt mechanism about a tilt central axis provided in linking portions, the seat front panel being linked to the left side frame and the right side frame via the linking portions, an axial direction of the tilt central axis coinciding with a seat width direction, the seat front panel having a seat cushion airbag device including:
      an inflator configured to supply a gas; and
      a seat cushion airbag configured to inflate and deploy upon receiving the supplied gas from the inflator, the inflation and deployment of the seat cushion airbag causing the seat cushion to bulge in a seat upward direction; and
   a control device connected to the power tilt mechanism, the control device being configured to:
      activate the power tilt mechanism and rotate the seat front panel in the seat upward direction upon predicting a vehicle impact in which an occupant sitting on the seat cushion will move in a seat forward direction, and
      cause the seat cushion airbag to inflate and deploy, upon a detection of the vehicle impact after the prediction of the vehicle impact.

2. The vehicle seat according to claim 1, wherein:
   the inflator is disposed at a front portion of the seat front panel,
   the seat cushion airbag is stored in a spread-out state on the seat front panel, and
   in an inflated and deployed state, a rear end of the seat cushion airbag is positioned at a seat front side of the tilt central axis of the seat front panel.

3. The vehicle seat according to claim 1, wherein the seat cushion airbag device includes:
   a reaction force panel configured to support a front end of the seat cushion airbag from a seat front side when the seat cushion airbag is inflated and deployed; and
   a stopper configured to restrain a displacement of the reaction force panel in the seat forward direction when the seat cushion airbag is inflated and deployed.

4. The vehicle seat according to claim 3, wherein:
   the inflator is housed inside a housing portion provided in the seat front panel and is recessed in a seat downward direction,
   the reaction force panel is joined to the front end of the seat cushion airbag, and
   a portion of the reaction force panel is positioned between the inflator and a front wall of the housing portion when the seat cushion airbag is inflated and deployed.

5. The vehicle seat according to claim 4, wherein:
   the seat cushion airbag includes an extra length portion disposed between a lower end portion of the reaction force panel and a location where the inflator is secured to a bottom wall of the housing portion when the seat cushion airbag is in a stored state, and
   a length of the extra length portion in a seat front-rear direction is set to a length such that the lower end portion of the reaction force panel displaces to a position between the front wall and the inflator when the seat cushion airbag is inflated and deployed.

6. The vehicle seat according to claim 4, wherein an upper end portion of the reaction force panel is positioned inside the housing portion when the seat cushion airbag is in a stored state.

7. The vehicle seat according to claim 4, wherein the stopper is configured by the front wall of the housing portion and the inflator, the stopper sandwiching the reaction force panel when the seat cushion airbag is inflated and deployed.

* * * * *